United States Patent
Angelov

(10) Patent No.: US 8,078,671 B2
(45) Date of Patent: Dec. 13, 2011

(54) SYSTEM AND METHOD FOR DYNAMIC WEB SERVICES DESCRIPTOR GENERATION USING TEMPLATES

(75) Inventor: Dimitar V. Angelov, Montana (BG)

(73) Assignee: SAP AG, Walldorf (DE)

( * ) Notice: Subject to any disclaimer, the term of this patent is extended or adjusted under 35 U.S.C. 154(b) by 1023 days.

(21) Appl. No.: 11/232,717

(22) Filed: Sep. 21, 2005

(65) Prior Publication Data

US 2007/0067421 A1 Mar. 22, 2007

(51) Int. Cl.
G06F 15/16 (2006.01)
G06F 15/177 (2006.01)

(52) U.S. Cl. .................. 709/203; 709/219; 709/221

(58) Field of Classification Search .............. 709/203
See application file for complete search history.

(56) References Cited

U.S. PATENT DOCUMENTS

| | | | |
|---|---|---|---|
| 5,404,470 A | 4/1995 | Miyake | |
| 6,023,684 A | 2/2000 | Pearson | |
| 6,202,207 B1 | 3/2001 | Donohue | |
| 6,560,633 B1 | 5/2003 | Roberts et al. | |
| 6,604,113 B1 | 8/2003 | Kenyon et al. | |
| 6,856,995 B1 | 2/2005 | Ibitayo et al. | |
| 6,947,943 B2 | 9/2005 | DeAnna et al. | |
| 6,954,792 B2 | 10/2005 | Kang et al. | |
| 6,985,939 B2 | 1/2006 | Fletcher et al. | |
| 7,028,223 B1 | 4/2006 | Kolawa et al. | |
| 7,123,980 B2 | 10/2006 | Funk et al. | |
| 7,127,700 B2 | 10/2006 | Large | |
| 7,159,224 B2 | 1/2007 | Sharma et al. | |
| 7,246,358 B2 | 7/2007 | Chinnici et al. | |
| 7,284,039 B2 | 10/2007 | Berkland et al. | |
| 7,296,022 B2 | 11/2007 | Harjanto | |
| 7,814,060 B2 | 10/2010 | Stoyanova | |
| 2002/0046239 A1* | 4/2002 | Stawikowski et al. | 709/203 |
| 2002/0067370 A1 | 6/2002 | Forney et al. | |
| 2002/0178214 A1 | 11/2002 | Brittenham et al. | |
| 2002/0184237 A1 | 12/2002 | McFeely | |
| 2003/0004746 A1 | 1/2003 | Kheirolomoom et al. | |
| 2003/0014733 A1 | 1/2003 | Ringseth et al. | |
| 2003/0033369 A1 | 2/2003 | Bernhard | |
| 2003/0055878 A1 | 3/2003 | Fletcher et al. | |
| 2003/0084056 A1 | 5/2003 | DeAnna et al. | |

(Continued)

FOREIGN PATENT DOCUMENTS

| | | |
|---|---|---|
| EP | 1387262 A1 * | 2/2004 |
| EP | 1566940 A1 | 8/2005 |
| WO | WO-03073309 A1 | 9/2003 |

OTHER PUBLICATIONS

"U.S. Appl. No. 10/749,700, Advisory Action mailed Sep. 12, 2008", 4 pgs.

(Continued)

*Primary Examiner* — Jeffrey Pwu
*Assistant Examiner* — Jasmine Myers
(74) *Attorney, Agent, or Firm* — Schwegman, Lundberg & Woessner, P.A.

(57) ABSTRACT

A system and method for generating a Web services description file is described. In one embodiment, a visualizer process metadata from a configuration file and applies the metadata to a predefined template to generate a portion of a Web services description file. The configuration file stores metadata about a service provided by a Web service. The template file defines structure and syntax of a portion of a Web services description file.

22 Claims, 10 Drawing Sheets

U.S. PATENT DOCUMENTS

| | | | |
|---|---|---|---|
| 2003/0110242 A1 | 6/2003 | Brown et al. | |
| 2003/0110373 A1 | 6/2003 | Champion | |
| 2003/0126136 A1 | 7/2003 | Omoigui | |
| 2003/0191803 A1 | 10/2003 | Chinnici et al. | |
| 2003/0204612 A1 | 10/2003 | Warren | |
| 2003/0204645 A1 | 10/2003 | Sharma et al. | |
| 2003/0220925 A1 | 11/2003 | Lior | |
| 2003/0226139 A1 | 12/2003 | Lee | |
| 2003/0233477 A1 | 12/2003 | Ballinger | |
| 2004/0015564 A1 | 1/2004 | Williams | |
| 2004/0015578 A1 | 1/2004 | Karakashian et al. | |
| 2004/0017392 A1 | 1/2004 | Welch | |
| 2004/0024841 A1 | 2/2004 | Becker et al. | |
| 2004/0030627 A1 | 2/2004 | Sedukhin | |
| 2004/0044656 A1 | 3/2004 | Cheenath | |
| 2004/0045005 A1 | 3/2004 | Karakashian | |
| 2004/0054969 A1 | 3/2004 | Chiang et al. | |
| 2004/0060057 A1 | 3/2004 | Hansen et al. | |
| 2004/0064554 A1 | 4/2004 | Kuno et al. | |
| 2004/0068554 A1* | 4/2004 | Bales et al. | 709/218 |
| 2004/0088352 A1 | 5/2004 | Kurth | |
| 2004/0117733 A1 | 6/2004 | Moreau et al. | |
| 2004/0128370 A1 | 7/2004 | Kortright | |
| 2004/0139151 A1 | 7/2004 | Flurry | |
| 2004/0149105 A1 | 8/2004 | Michalski | |
| 2004/0172441 A1 | 9/2004 | Beringer et al. | |
| 2004/0172555 A1 | 9/2004 | Beringer et al. | |
| 2004/0181537 A1 | 9/2004 | Chawla et al. | |
| 2004/0194105 A1 | 9/2004 | Shenfield et al. | |
| 2004/0199636 A1 | 10/2004 | Brown et al. | |
| 2004/0199896 A1 | 10/2004 | Goodman et al. | |
| 2004/0202330 A1* | 10/2004 | Harvey et al. | 380/277 |
| 2004/0205104 A1 | 10/2004 | Harvey et al. | |
| 2004/0213409 A1* | 10/2004 | Murto et al. | 380/258 |
| 2004/0221017 A1 | 11/2004 | Yoon | |
| 2004/0243338 A1 | 12/2004 | Sabiers et al. | |
| 2004/0267927 A1 | 12/2004 | Davis et al. | |
| 2005/0015375 A1 | 1/2005 | Harjanto | |
| 2005/0015491 A1 | 1/2005 | Koeppel | |
| 2005/0038708 A1 | 2/2005 | Wu | |
| 2005/0080801 A1 | 4/2005 | Kothandaraman et al. | |
| 2005/0086664 A1 | 4/2005 | Sundaresan et al. | |
| 2005/0091087 A1 | 4/2005 | Smith et al. | |
| 2005/0096960 A1 | 5/2005 | Plutowski et al. | |
| 2005/0097178 A1 | 5/2005 | Bala | |
| 2005/0125524 A1 | 6/2005 | Chandrasekhar et al. | |
| 2005/0138041 A1 | 6/2005 | Alcorn et al. | |
| 2005/0251495 A1 | 11/2005 | Woollen | |
| 2005/0278270 A1* | 12/2005 | Carr et al. | 706/25 |
| 2005/0278417 A1 | 12/2005 | Fremantle et al. | |
| 2006/0015513 A1 | 1/2006 | Poyhonen et al. | |
| 2006/0015625 A1 | 1/2006 | Ballinger et al. | |
| 2006/0029054 A1* | 2/2006 | Breh et al. | 370/385 |
| 2006/0041636 A1 | 2/2006 | Ballinger et al. | |
| 2006/0173984 A1 | 8/2006 | Emeis et al. | |
| 2006/0173985 A1 | 8/2006 | Moore | |
| 2006/0190580 A1 | 8/2006 | Shu et al. | |
| 2006/0200748 A1 | 9/2006 | Shenfield | |
| 2006/0200749 A1 | 9/2006 | Shenfield | |
| 2006/0206890 A1 | 9/2006 | Shenfield et al. | |
| 2006/0236306 A1* | 10/2006 | DeBruin et al. | 717/113 |
| 2007/0064680 A1 | 3/2007 | Savchenko et al. | |
| 2007/0067388 A1 | 3/2007 | Angelov | |
| 2007/0073221 A1 | 3/2007 | Bialecki et al. | |
| 2007/0118844 A1 | 5/2007 | Huang et al. | |
| 2007/0150546 A1 | 6/2007 | Karakashian et al. | |
| 2007/0156756 A1 | 7/2007 | Stoyanova | |
| 2007/0156859 A1 | 7/2007 | Savchenko et al. | |
| 2007/0156872 A1 | 7/2007 | Stoyanova | |
| 2007/0174288 A1 | 7/2007 | Stoyanova | |
| 2008/0189713 A1 | 8/2008 | Betzler et al. | |

OTHER PUBLICATIONS

"U.S. Appl. No. 10/749,700, Appeal Brief filed Nov. 25, 2008", 22 pgs.

"U.S. Appl. No. 10/749,700, Examiner's Answer mailed Feb. 23, 2009", 10 pgs.

"U.S. Appl. No. 10/749,700, Final Office Action mailed Jun. 27, 2008", 8 pgs.

"U.S. Appl. No. 10/749,700, Non Final Office Action mailed Feb. 5, 2008", 9 pgs.

"U.S. Appl. No. 10/749,700, Reply Brief filed Mar. 3, 2009", 7 pgs.

"U.S. Appl. No. 10/749,700, Response filed Apr. 30, 2008 to Non Final Office Action mailed Feb. 5, 2008", 11 pgs.

"U.S. Appl. No. 10/749,700, Response filed Aug. 25, 2008 to Final Office Action mailed Jun. 27, 2008", 11 pgs.

"U.S. Appl. No. 11/232,660, Non Final Office Action mailed Dec. 22, 2008", 18 pgs.

"U.S. Appl. No. 11/232,660, Non-Final Office Action mailed Jul. 8, 2009", 15 pgs.

"U.S. Appl. No. 11/232,660, Response filed Mar. 20, 2009 to Non Final Office Action mailed Dec. 22, 2008", 11 pgs.

"U.S. Appl. No. 11/322,567, Final Office Action mailed Oct. 27, 2008", 6 pgs.

"U.S. Appl. No. 11/322,567, Non Final Office Action mailed Dec. 31, 2007", 12 pgs.

"U.S. Appl. No. 11/322,567, Non-Final Office Action mailed Mar. 31, 2009", 22 pgs.

"U.S. Appl. No. 11/322,567, Response filed Jan. 27, 2009 to Final Office Action mailed Oct. 27, 2008", 8 pgs.

"U.S. Appl. No. 11/322,567, Response filed Jun. 19, 2009 to Non Final Office Action mailed Mar. 31, 2009", 9 pgs.

"U.S. Appl. No. 11/322,567, Response filed Jul. 28, 2008 to Non Final Office Action mailed Dec. 31, 2007", 12 pgs.

"U.S. Appl. No. 11/322,605, Final Office Action mailed Jun. 11, 2009", 20 pgs.

"U.S. Appl. No. 11/322,605, Non Final Office Action mailed Nov. 14, 2008", 26 pgs.

"U.S. Appl. No. 11/322,605, Response filed Mar. 13, 2009 to Non Final Office Action mailed Nov. 14, 2008", 11 pgs.

"U.S. Appl. No. 11/323,064, Final Office Action mailed Jun. 10, 2009", 16 pgs.

"U.S. Appl. No. 11/323,064, Non Final Office Action mailed Nov. 19, 2008", 17 pgs.

"U.S. Appl. No. 11/323,064, Response filed Mar. 18, 2009 to Non Final Office Action mailed Nov. 19, 2008", 12 pgs.

"U.S. Appl. No. 11/323,770, Final Office Action mailed Jun. 12, 2009", 12 pgs.

"U.S. Appl. No. 11/323,770, Non Final Office Action mailed Dec. 22, 2008", 12 pgs.

"U.S. Appl. No. 11/323,770, Response filed Mar. 20, 2009 to Non Final Office Action mailed Dec. 22, 2008", 15 pgs.

"Sun One Architecture Guide—Delivering on Demand", *Sun Microsystems, Inc.*, (2002), 185-186, 211.

"The J2EE Tutorial: Web Application Archives", Sun.com, sun.com/j2ee/tutorial/1-3-fcs/doc/WCC3.html, 1-4.

Banerji, A., et al., "Web Services Conversation Language (WSCL) 1.0", *W3C Note, World Wide Web Consortium*, URL http://www.w3.org/TR/wscl10/, (Mar. 2002).

Bussler, Christopher, et al., "A conceptual architecture for semantic web enabled services", *Dieter Fensel, Alexander Maedche, ACM SIGMOD Record*, v. 31, n. 4, (Dec. 2002), 6 pgs.

Dustdar, Schahram, et al., "A View Based Analysis on Web Service Registries", *Martin Treiber, Ditributed and Parallel Databases*, v. 18, n. 2, (Sep. 2005), 147-171.

Fielding, R, et al., "Hypertext Transfer Protocol—HTTP/1.1", ftp://ftp.isi.edu/in-notes/rfc2616.txt, (Jun. 1999), 1-196.

Huhns, Michael N., et al., "Service-Oriented Computing: Key Concepts and Principles", *IEEE Internet Computing, Munindar P. Singh*, v.9, n. 1, (Jan. 2005), 75-81.

Hull, Richard, et al., "Tools for Composite Web Services: A Short Overview", Jianwen Su, *ACM SIGMOD Record*, v. 34, No. 2, (Jun. 2005), 10 pgs.

Ingham, et al., "Supporting Highly Manageable Web Services", *Elsevier Science B. V.*, (1977), 1405-1416.

Litoiu, "Migrating to Web Services—Latency and Scalability", *IEEE*, (2002), 1-8.

Nandigam, J., et al., "Semantic Web Services", *Journal of Computing Sciences in Colleges*, v.21 i.1, (Oct. 2005), 50-63.

Shepherd, George, et al., "Programming with Microsoft Visual C++. Net", *Microsoft Press Sixth Edition*, (2003), 391-397, 771, 806-807, 820-826.

Siddhartha, et al., "Web Services Interoperability: A Practitioner's Experience", *Springer-Verlag Berlin-Heidelberg*, (2002), 587-601.

Sun, "XML Servlet Schema 2.4", [Online]. Retrieved from the Internet: <URL: www.sun.com/xml/j2ee/web-app_2_4 .xsd>, (Aug. 5, 2004), 17 pgs.

Yang, et al., "The XML Cover Pages", *Westbridge Technology*, 1-4.

"U.S. Appl. No. 11/232,660, Response filed Oct. 2, 2009 to Non Final Office Action mailed Jul. 8, 2009", 9 pgs.

"U.S. Appl. No. 11/322,567, Final Office Action mailed Oct. 13, 2009", 13 pgs.

"U.S. Appl. No. 11/322,605, Non Final Office Action mailed Oct. 15, 2009", 28 pgs.

"U.S. Appl. No. 11/322,605, Response filed Aug. 11, 2009 to Final Office Action mailed Jun. 11, 2009", 12 pgs.

"U.S. Appl. No. 11/323,064, Non Final Office Action mailed Oct. 14, 2009", 20 pgs.

"U.S. Appl. No. 11/323,064, Non-Final Office Action mailed Oct. 14, 2009", 21 Pgs.

"U.S. Appl. No. 11/323,064, Response filed Aug. 7, 2009 to Final Office Action mailed Jun. 10, 2009", 11 pgs.

"U.S. Appl. No. 11/323,770, Non-Final Office Action mailed Oct. 15, 2009", 12 pgs.

"U.S. Appl. No. 11/323,770, Response filed Aug. 11, 2009 to Final Office Action mailed Jun. 12, 2009", 11 pgs.

"IEEE 100 The Authoritative Dictionary of IEEE Standard Terms", *IEEE, 7th Ed*, (Dec. 2000),101-102.

"Web Service Description Language (WSDL) 1.1", *W3C* www(dot)W3C(dot)orgITR/wsdl_Section_2.1_WSDL_Document_Structure, (Mar. 2001).

Czajkowski, et al., ""The WS-Resource Framework, Version 1.0," xml(dot)coverpages (dot)org/WSRF-Overviewv10", 20040305.pdf., (Mar. 2004).

"U.S. Appl. No. 10/749,700, Advisory Action mailed Jul. 23, 2009", 3 pgs.

"U.S. Appl. No. 11/232,660, Non-Final Office Action mailed Jun. 10, 2010", 14 pgs.

"U.S. Appl. No. 11/232,660, Response filed Apr. 14, 2010 to Final Office Action mailed Jan. 25, 2010", 11 pgs.

"U.S. Appl. No. 11/322,567, Supplemental Amendment and Figures mailed Jun. 15, 2010", 85 pgs.

"U.S. Appl. No. 11/322,605, Response filed Jun. 15, 2010 to Final Office Action mailed Mar. 26, 2010", 12 pgs.

"U.S. Appl. No. 11/322,605, Supplemental Amendment and Figures mailed Jun. 17, 2010", 85 pgs.

"U.S. Appl. No. 11/323,064, Final Office Action mailed Apr. 15, 2010", 28.

"U.S. Appl. No. 11/323,064, Response filed Jun. 15, 2010 to Final Office Action mailed Apr. 15, 2010", 13 pgs.

"U.S. Appl. No. 11/323,064, Supplemental Amendment and Figures filed Jun. 17, 2010", 85 pgs.

"U.S. Appl. No. 11/323,770, Final Office Action mailed Apr. 13, 2010", 13 pgs.

"U.S. Appl. No. 11/323,770, Response filed Jun. 10, 2010 to Final Office Action mailed Apr. 13, 2010", 12 pgs.

Weerawarana, et al., "Web Services Platform Architecture", *Prentice Hall, Chapter 7*, (Mar. 22, 2005), 14 pgs.

"U.S. Appl. No. 11/322,567 Notice of Allowance mailed Aug. 3, 2010", 11 pgs.

"U.S. Appl. No. 11/322,605, Non-Final Office Action mailed Jul. 30, 2010", 22 pgs.

"U.S. Appl. No. 11/323,064, Non-Final Office Action mailed Aug. 11, 2010", 21 pgs.

"U.S. Appl. No. 11/323,770, Advisory Action mailed Jun. 18, 2010", 3 pgs.

"U.S. Appl. No. 11/232,660, Final Office Action mailed Nov. 4, 2010", 16 pgs.

"U.S. Appl. No. 11/232,660, Response filed Aug. 31, 2010 to Non Final Office Action mailed Jun. 10, 2010", 11 pgs.

"U.S. Appl. No. 11/322,605, Final Office Action mailed Dec. 9, 2010", 23 pgs.

"U.S. Appl. No. 11/322,605, Response filed Jan. 28, 2011 to Final Office Action mailed Dec. 9, 2010", 16 pgs.

"U.S. Appl. No. 11/322,605, Response filed Oct. 22, 2010 to Non Final Office Action mailed Jul. 30, 2010", 15 pgs.

"U.S. Appl. No. 11/323,770, Non-Final Office Action mailed Sep. 16, 2010", 18 pgs.

"U.S. Appl. No. 11/323,770, Response filed Jul. 28, 2010 to Final Office Action mailed Apr. 13, 2010", 11 pgs.

Intel, "Intel Hyper-Threading Technology: Technical User's Guide", [Online]. Retrieved from the Internet: <URL: http://cache-www.intel.com/cd/00/00/01/77/17705_htt_user_guide.pdf>, (Jan. 2003), 44 pgs.

Narten, Thomas, "The Mechanics of Thread Switching", [Online]. Retrieved from the Internet: <URL: http://www.cs.duke.edu/-narten/11 0/nachos/main/node13.html>, (Feb. 3, 1997), 2 pgs.

Bellwood, Tom , et al., "UDDI V3 Specification", (Jul. 19, 2002).

Berners-Lee, T., et al. N., "Uniform Resource Identifiers (URI) Generic Syntax", (Aug. 1998), 40 pages.

Bradner, S. , "RFC 2119 (rfc2119): Key Words for use in RFCs to Indicate Requirement Levels", (Mar. 1997), 3 pages.

Bray, Tim , et al., "Extensible Markup Language (XML) 1.0 (Second Edition)", *W3C Recommendation*, (Oct. 6, 2000), 59 pages.

Christensen, E. , et al., "Web Service Definition Language (WSDL)", (Mar. 15, 2001).

Fielding, R., et al. N., "Hypertext Transfer Protocol—HTTP/1.1", (Jun. 1999), 114 pages.

Freier, A. , et al., "SSL Protocol V. 3.0 The SSL Protocol", (Mar. 1996), 3 pages.

Gudgin, M. , "SOAP Version 1.2 Part 1: Messaging Framework", (Jun. 24, 2003).

Gudgin, M. , et al., "SOAP Version 1.2 Part 2: Adjuncts", (Jun. 24, 2003).

Klensin, J. N., "Simple Mail Transfer Protocol", (Apr. 2001), 79 pages.

Knutson, Jim , et al., "Web Services for J2EE, Version 1.0", (Sep. 2002), 76 pages.

Newcomer, Eric , "Understanding Web Services: XML, WSDL, SOAP and UDDI", Indianapolis, IN: Pearson Education, Inc., (2002).

Postel, J., et al. N., "File Transfer Protocol (FTP)", (Oct. 1985), 69 Pages.

Santesson, S. , "Internet X.509 Public Key Infrastructure Subject Alternative Name for Expression of Service Name", (Aug. 2007), 10 pages.

Shannon, B. , "Java 2 Platform Enterprise Edition Specification, vI.3" *Sun Microsystems*, (Jul. 2001), 161 pages.

Sun Microsystems, "Building Web Services", *Sun One Studio 5 Programming Series*, (Jun. 2003), 214 Pages.

Sun Microsystems, "JAVA API for XML-based RPC JAX-RPC 1.1", *JSR-101*, 167 Pages, (Oct. 14, 2003).

"U.S. Appl. No. 11/322,605, Advisory Action mailed Feb. 15, 2011", 5 pgs.

"U.S. Appl. No. 11/322,605, Notice of Allowance mailed Aor. 7, 2011", 15 pgs.

"U.S. Appl. No. 11/322,605, Pre-Appeal Brief filed Mar. 9, 2011", 5 pgs.

Fielding, et al., "Hypertext Transfer Protocol—HTTP/1.1", RFC 2616, Section 9.3, (Jun. 1999), 353 pgs.

\* cited by examiner

```
<?xml version="1.0"?>
<definitions name="PatentFilings"
targetNamespace="http://bstz.com/patents.wsdl"
    xmlns:tns="http://bstz.com/patents.wsdl"
    xmlns:xsd1="http://bstz.com/patents.xsd"
    xmlns:soap="http://schemas.xmlsoap.org/wsdl/soap/"
    xmlns="http://schemas.xmlsoap.org/wsdl/">
  <types>
      <schema targetNamespace="http://bstz.com/patents.xsd"
         xmlns="http://www.w3.org/2000/10/XMLSchema">
        <element name="PatentAppNumber">
          <complexType>
            <all>
              <element name="AppNumber" type="string"/>
            </all>
          </complexType>
        </element>
      </schema>
  </types>
```
Types 201

```
<message name="GetStatus">
    <part name="body" element="xsd1:PatentStatus"/>
</message>
```
Message 203

```
<portType name="PatentAppPortType">
    <operation name="GetStatus">
       <input message="tns:GetStatusInput"/>
       <output message="tns:GetStatusOutput"/>
    </operation>
</portType>
```
Port Type 205

```
<binding name="PatentAppSoapBinding" type="tns:PatentAppPortType">
    <soap:binding style="document" transport="http://schemas.xmlsoap.org/soap/http"/>
    <operation name="GetStatus">
       <soap:operation soapAction="http://bstz.com/GetStatus"/>
       <input>
          <soap:body use="literal"/>
       </input>
       <output>
          <soap:body use="literal"/>
       </output>
    </operation>
</binding>
```
Binding 207

```
<service name="PatentAppService">
    <port name="PatentAppPort" binding="tns:PatentAppSoapBinding">
      <soap:address location="http://bstz.com/patentapp"/>
    </port>
</service>
</definitions>
```
Service 209

FIG. 2
PRIOR ART

SYSTEM AND METHOD FOR DYNAMIC WEB SERVICES DESCRIPTOR GENERATION USING TEMPLATES

BACKGROUND

1. Field of the Invention

This invention relates generally to the field of data processing systems. More particularly, the invention relates to a system and method for improving Web services description generation and maintenance including the formation of WSDL files.

2. Description of the Related Art

The term "web services" can be viewed as a technology for engaging in business relationships (e.g., buying and selling) in a partially or wholly automated fashion over a network such as the Internet. FIG. 1 shows a web services model 100 that includes a registry 101, a service provider 102 and a service consumer 103. A service consumer 103, or "service requester", is generally understood to be an entity that seeks and (in cases where a suitable web service is found) uses a particular web service through a network 104.

The registry 101 includes listings of various "available" services, and, may assist the service consumer 103 in searching for a suitable service provider based on the web servicing needs of the service consumer 103. A service provider 102 is the provider of one or more web services that can be accessed over the network 104. Because of the vast expanse of the Internet and interest in automated business engagements, many registries, service consumers and service providers may be in operation at any instant of time.

Presently, the responsibilities of the most prevalent registry function 101 that is associated with the web services effort are defined in various Universal Discovery, Description and Integration (UDDI) specifications provided by uddi.org. Besides providing listings of available services, a UDDI registry 101 may also make available to a service consumer 103 additional details that pertain to any particular web service such as: 1) the location of the web service (e.g., its URI specified by a specific network destination address or name); 2) the capabilities of the web service (e.g., specific methods that are supported by the web service and that may be called upon by the service consumer), and, 3) communication semantics needed for invoking the web service through the network 104 (e.g., the structure of a messaging format and/or protocol needed to properly communicate with the web service).

According to one widely adopted approach, such "additional details" are described in Web Services Definition Language (WSDL) text documents written in extensible Markup Language (XML). Here, for example, for each web service that the registry 101 maintains a listing of, the registry 101 also maintains a WSDL document that describes the location, capabilities and communication semantics of the web service. Presently, a WSDL document for a particular web service is expected to include an "abstract interface" description of the web service (which includes the web service's methods and the data passed between the web service provider and web service consumer) and a "concrete implementation" description of the web service (which includes specific protocol and data format specifications for communicating with the web service (referred to as a "binding") and the location of the web service (referred to as a "port")).

According to another widely adopted approach, with respect to the actual communication that occurs between the service consumer 103 and the service provider 102, such communication is implemented through an exchange of Simple Object Access Protocol (SOAP) text messages written in XML.

WSDL files are created in the XML format that describe a Web service provider's services as a set of endpoints (or ports) operating on messages containing either document-oriented or procedure-oriented information. For example, a SOAP message may be directed toward a particular port of a Web services provider from a remote client. FIG. 2 illustrates an exemplary WSDL file.

A WSDL file generally contains information for types 201, messages 203, port types 205, bindings 207, and services 209 supported by the Web service provider. From this WSDL file a client may determine how to communicate with a Web service and what functionality the Web service provides.

A type describes for data type definitions using a type system. For example, the type system may be XSD (XML Schema Descriptor). In the example of FIG. 2, the type 201 is an XSD file called patents.xsd. This file is located on the Web service provider's server (here bstz.com).

Messages in a WSDL file are described abstractly and define the data being communicated between endpoints or ports. For example, the message 203 is called "GetStatus" and provides the patent status in the body of the message.

Port types are abstract collections of operations supported by a Web service. Each operation describes a function supported. The port type 205 illustrated describes the operation "GetStatus" including the input and output message format to be adhered to.

Bindings are concrete protocols and define the particular data format for a particular port type. In the example, the binding 207 associates the "GetStatus" operation with a SOAP message.

A port is defined by binding a network protocol and message format. A collection of these ports define a service. The service 209 ties the "PatentAppSoaPBinding to the port "PatentAppPort."

Current WSDL document generation requires manual intervention to describe the Web service. Either a program such as GLUE is run or the WSDL file is generated manually. In either case, these WSDL files cannot be automatically generated based upon a request to the service provider.

Additionally, WSDL files were generated from web service artifacts such as Virtual Interface, WSD and web-services-deployment-descriptor which were inside a web service archive. The WSDL generation was done at the deployment time of a web service. Accordingly, when request is made for WSDL visualization, the WSDL simply read from the file system. In this approach it is impossible for a configuration to be edited/removed/added at runtime without editing the web service artifacts, updating the archive, and redeploying it.

SUMMARY

A system and method for generating a Web services description file is described. In one embodiment, a visualizer process metadata from a configuration file and applies the metadata to a predefined template to generate a portion of a Web services description file. The configuration file stores metadata about a service provided by a Web service. The template file defines structure and syntax of a portion of a Web services description file.

FIGURES

The present invention is illustrated by way of example, and not limitation, in the figures of the accompanying drawings in which like references indicate similar elements and in which:

FIG. 2 illustrates an exemplary WSDL file (prior art);

DETAILED DESCRIPTION

Described below is a system and method for dynamically generating a WSDL document. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention generates a WSDL document from the abstract and concrete data stored in a configuration file as applied to templates for binding and port type.

Dynamic WSDL Generation

In Web services systems, a WSDL file provides the outside world with the requirements for communicating with and utilizing the services of a service provider. As described earlier, these WSDL files are usually generated after a complete Web service has been defined by a provider and are likely to be an afterthought to the complex design process used to create a Web service. Dynamic creation and/or changing of WSDL documents allows for a Web service provider to describe new services or remove services easier. In one embodiment, as the WSDL document is updated or created without human intervention to create the WSDL document. For example, as soon as a new service is provided the WSDL document for the Web service provider is updated to reflect this change without having to manually create the new WSDL document.

Figure 1:
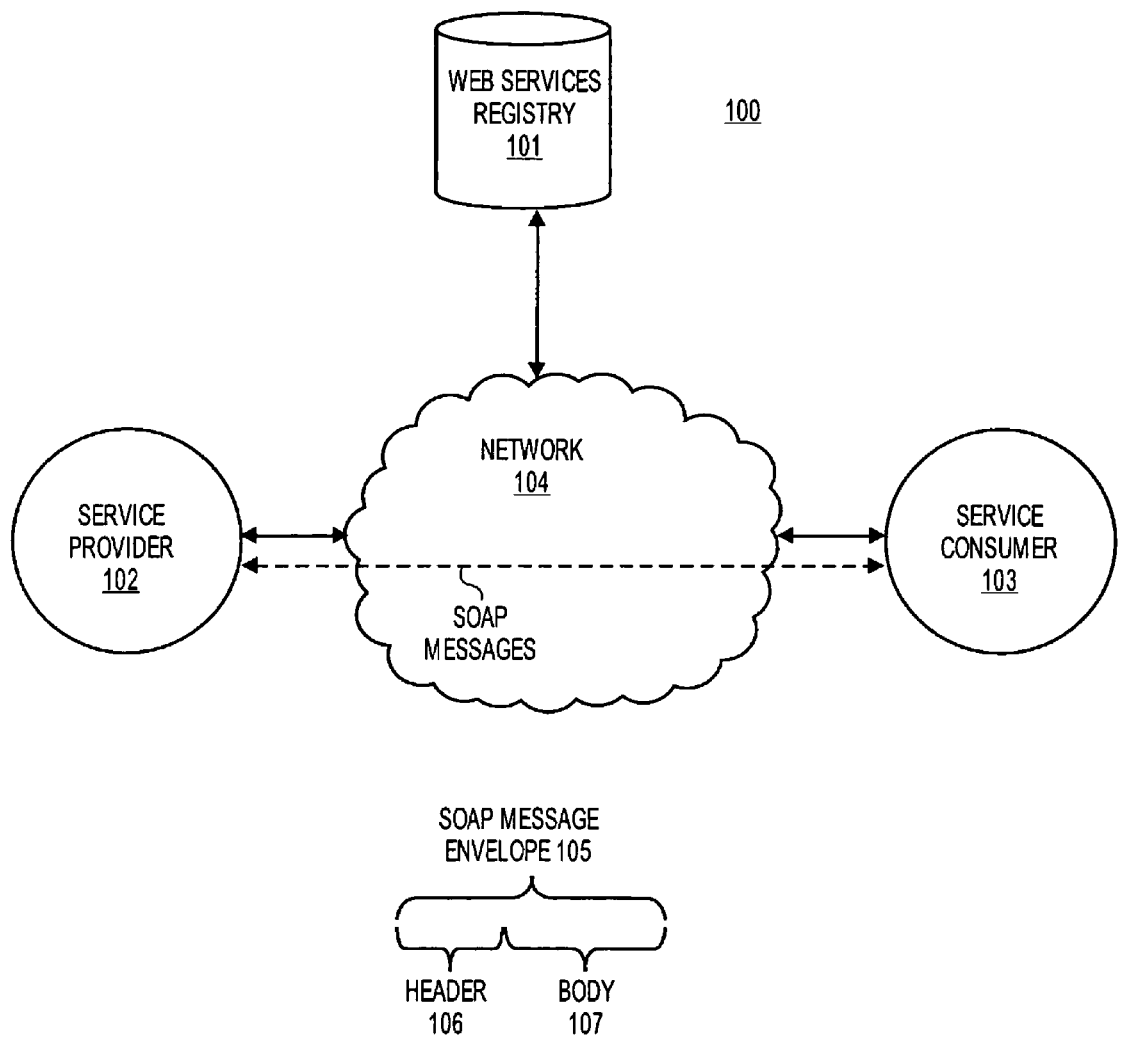
FIG. 1 shows a Web services model (prior art)
Figure 3:
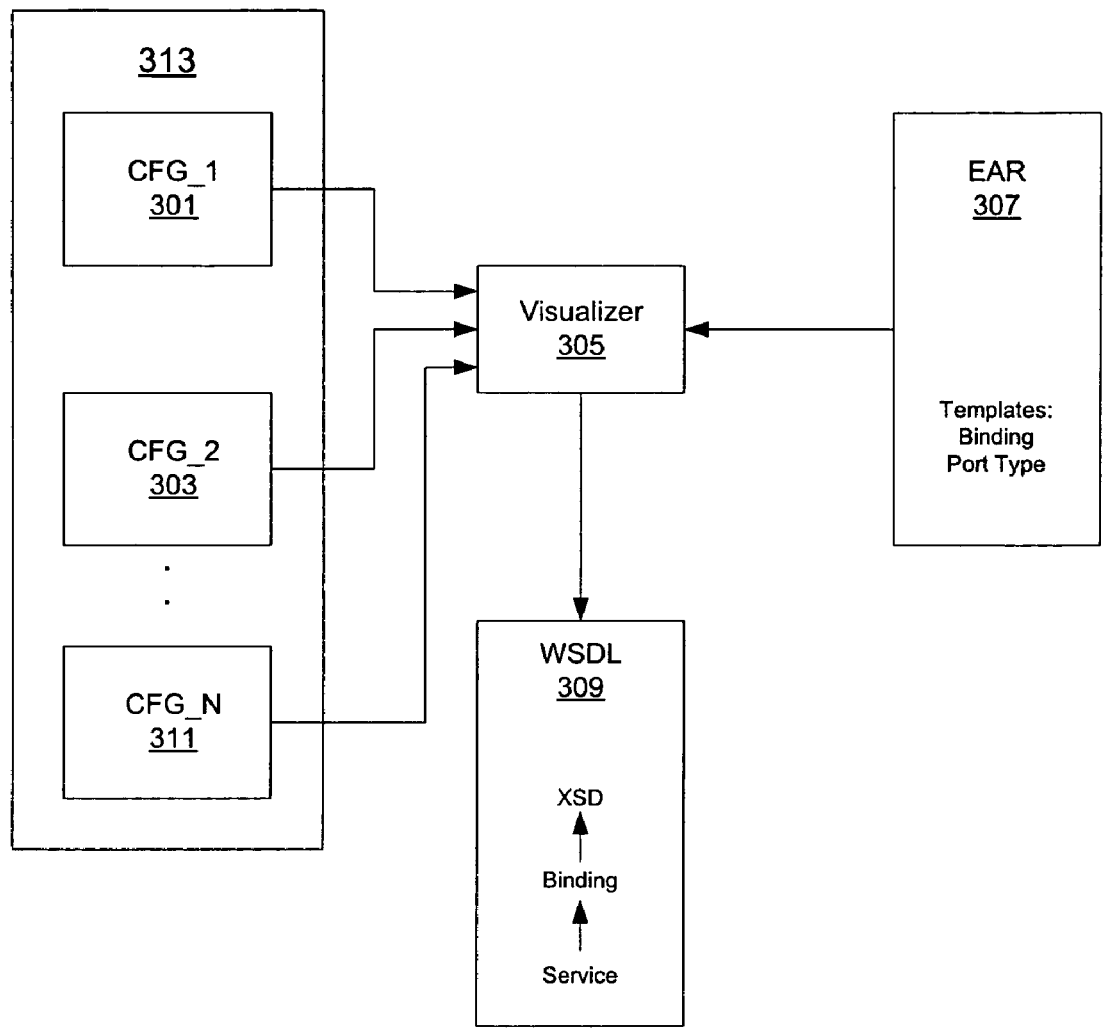
FIG. 3 illustrates an embodiment of a system for generating a WSDL document from templates and configuration data.

FIG. 3 illustrates an embodiment of a system for generating a WSDL document from templates and configuration data. These templates and configuration data were not available in the prior art. In an embodiment, a web services archive file contains WSDL templates and configuration file(s). These templates are generated during web service design time and are packaged inside the archive. This approach allows for dynamical edition/remove/add of a web service configuration. When a request for WSDL visualization is received, a WSDL file is generated dynamically using the WSDL template and configuration data. Each template stores information regarding the structure and syntax of a portion of a WSDL document. For example, the binding template contains information relating to the protocol configurations of the service.

Upon a request (HTTP, HTTPS, FTP, etc.), a visualizer 305 uses at least one configuration file 313 which may contain multiple configuration components 301, 303, 311 and a template (binding, port type, etc.) stored in an archive 307 to create at least a portion of a WSDL document (for example, the port type, service, or binding section of the WSDL). In one embodiment, the template is stored in an EAR (Enterprise Archive) file. For example, an HTTP request made to the visualizer 305 causes the visualizer 305 to apply the relevant metadata configuration components 301, 303, 311 available to the port type template of the EAR 307 to create a service for the WSDL 309. Likewise a binding request to the visualizer 305 creates a WSDL binding reference for the WSDL 309. This technique may be applied to existing Web services by maintaining (or creating) configuration components or files in addition to the maintaining the EAR file(s) that is already deployed. In one embodiment, there is a template for every portion of the WSDL document. For example, there is a template for types, messages, port types, bindings, and services.

Each configuration 301, 311, 303 stores WSDL metadata about a service provided by the Web service provider. In an embodiment, configuration components of a configuration file are also specific to a particular policy domain such as security, reliable messaging, etc. For example, configuration component CFG_1 301 contains metadata regarding the security protocol that is to be used by the Web service for a particular service. The policy domain for security may include the type of encryption used and/or the type of signature required. A client that has retrieved the WSDL file that was created using this configuration file will be able to ascertain the security protocol is being utilized by the provider and how to properly construct messages from the client to the provider using this protocol. Other configuration components 303, 311 contain other metadata about a service provided. For example, CFG_2 311 contains session data and CFG_N 303 contains security and reliable messaging data about a service. Configuration components may be dynamically added, removed, or modified depending upon the services that are to be provided by the Web service.

There are two types of data available in most WSDL implementations: abstract and concrete data. Abstract data is design time configuration data and is associated with a port type, type, and/or message. Runtime configuration data (concrete data) is associated with a binding, service, and/or port. In one embodiment, each configuration is associated with only a single port. The use of configuration files allows for the separation of abstract and concrete WSDL data which was not possible in prior art systems. This separation allows for the dynamic creation and/or changing of a WSDL document. A WSDL document could be separated into abstract (porttype) and concrete (binding) parts. The configuration data from the configuration file(s) is additional metadata which again could be separated to abstract and concrete. This configuration metadata represents additional information, which cannot be described by the standard WSDL elements (types, messages, porttypes, bindings, services, ports) such as specific kinds of securities (signature, encryption), quality of service for message delivery (exactly one, exactly one in order, etc.), etc. An example of abstract configuration data is "I want encryption" with the concrete configuration data being "the encryption will be DES."

Figure 4:
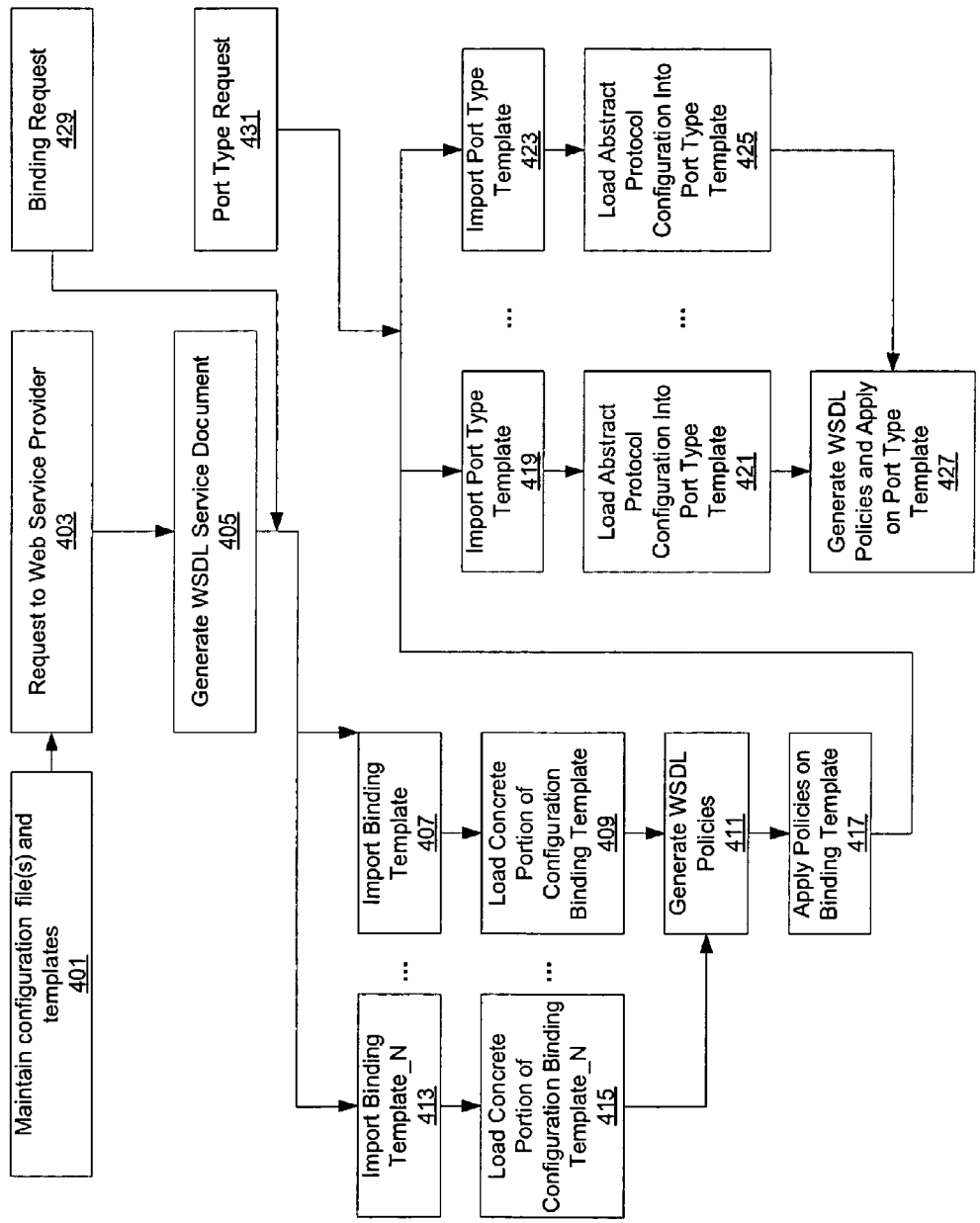
FIG. 4 illustrates an embodiment of the flow of dynamically creating a WSDL document.

FIG. 4 depicts an embodiment of the flow of dynamically creating (visualizing) a WSDL document. Of course it should be understood that the WSDL document may already exist and is modified accordingly. Template and configuration files and/or components for a Web service are maintained at 401. Throughout the life of the Web service these files are updated, including being added, removed, or modified, to reflect the current requirements for accessing and using the service.

A service request to the Web service provider from a client is made at 403. In an embodiment, exemplary requests include HTTP requests, HTTPS requests, binding requests, etc.

The service portion of the WSDL document is generated at 405 if a service request has been made by the client connecting to the provider. During the generation of a service document, a service data is obtained from a service data registry of the provider. This data includes the correct binding and port names are gathered from a based on the URI provided by the client. For example, the visualizer 305 of FIG. 3 obtains binding and port names from the templates of the EAR 307.

A binding request is made from the client to the provider for a specific port at 409. This binding request initiates the importing of a stored binding template at 407, 413. As illustrated in FIG. 4, several ports may have their relevant binding template imported. In this example, Binding Template_1 is associated with port 1 and Binding Template_N is associate with the Nth port of the provider's service. Accordingly, a binding request for port 1 initiates the importing of Binding Template_1.

With the appropriate binding template imported, the concrete portion of the configuration file associated with that binding template is loaded at 409, 415. For example, the protocol(s) definitions described in a configuration file associated with Binding Template_1 are imported into the WSDL service document.

WSDL policies are generated using the concrete data loaded at 411. An embodiment of this generation will be described in detail later in FIGS. 6A and 6B. WSDL policies may be Web service specific (for example, a policy may be a feature of a particular Web service implementation such as those deployed by IBM, SAP, Microsoft, etc.) or generic (for example, a policy may apply to a Web service specification like WS-Security or WS-ReliableMessaging). For ease of understanding, the term policy or policies encompasses both policy types unless otherwise noted.

These generated WSDL policies are then applied to the binding template at 417 to create the binding elements of the WSDL file.

A request for port type initiates the importing of a port type template at 431. Like binding, several port type templates may be imported 419, 423 based on the particular request.

The abstract portion of the relevant configuration file is loaded at 421, 425 into a port type template. The abstract portion describes the set of operations supported by the port. For example, in FIG. 2 the "GetStatus" operation is supported by the bstz.com Web service.

WSDL policies are generated by applying these abstract portions on the port type template at 427 to create the port type portion of the WSDL file. In one embodiment, this generation is done in a manner similar to that of WSDL policy generation for binding at 411. An embodiment of this generation will be described in detail later in FIGS. 6A and 6B.

A WSDL document is created or modified when the port types, bindings, and services have been created and/or modified. The service document imports one or more binding WSDL documents. By reading the import data from service WSDL document the WS consumer "understands" on what URL to request the binding WSDL document(s). Each binding WSDL document imports only one port type WSDL document. By reading the import data from the binding WSDL document the WS consumer "understands" on what URL to request the port type WSDL document. Thus, a complete WSDL document consists of at least three separate WSDL files which are downloaded from different URLs and which relate to one another via WSDL import elements as described below.

Figure 5:
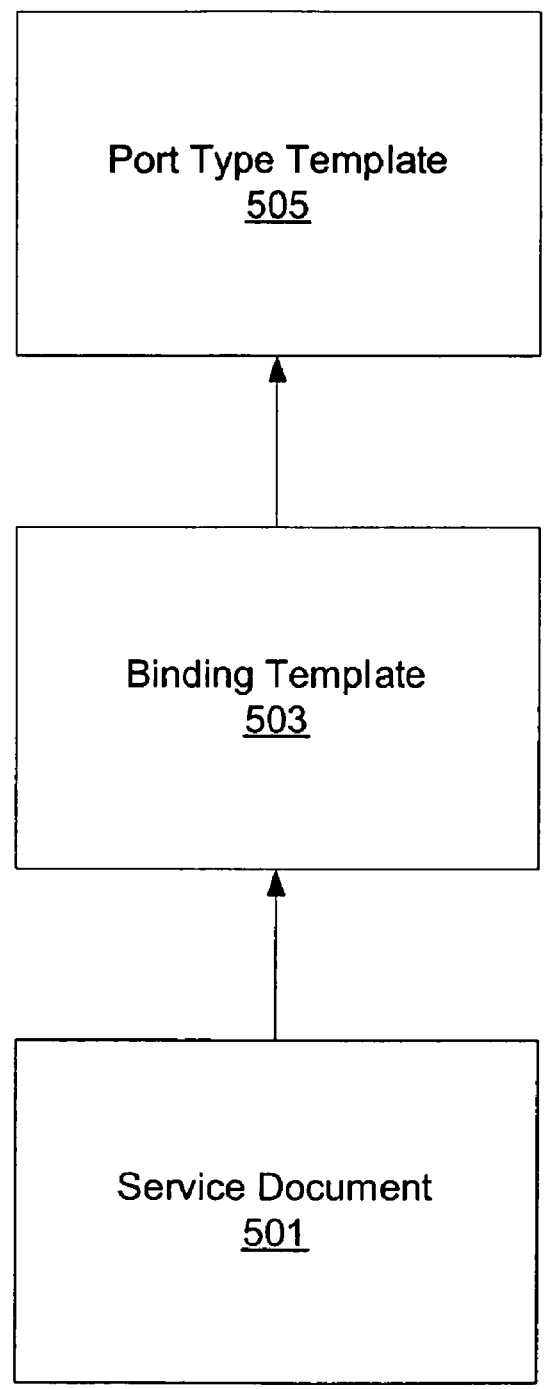
FIG. 5 illustrates the reference principles of templates applied in the creation of a WSDL document according to an embodiment.

FIG. 5 illustrates the import principles of templates applied in the creation of a WSDL document according to an embodiment. At least three documents and/or templates are used to create a WSDL file. A service document 501 is generated upon request. The service document describes services and their ports and addresses.

Binding templates 503 describe protocol configurations used in a Web service implementation. The binding template(s) 503 imports a port type WSDL document. The port type 505 template imports nothing.

Of course it should be understood that requests for service, binding, or port type may come in any order.

Server Side Policy Generation

Policy domains are sets of assertions for a particular protocol. Each assertion is an XML element defined by a particular Web services specification (for example, WS-Security, WS-ReliableMessaging, etc.) having some specific semantic and syntax. For example, in the security policy domain the assertions are the types of encryption or signatures used by the particular Web services provider. Configuration file information is converted into policies (non-implementation specific) or features (implementation specific) during the creation of WSDL documents.

Figure 6A:
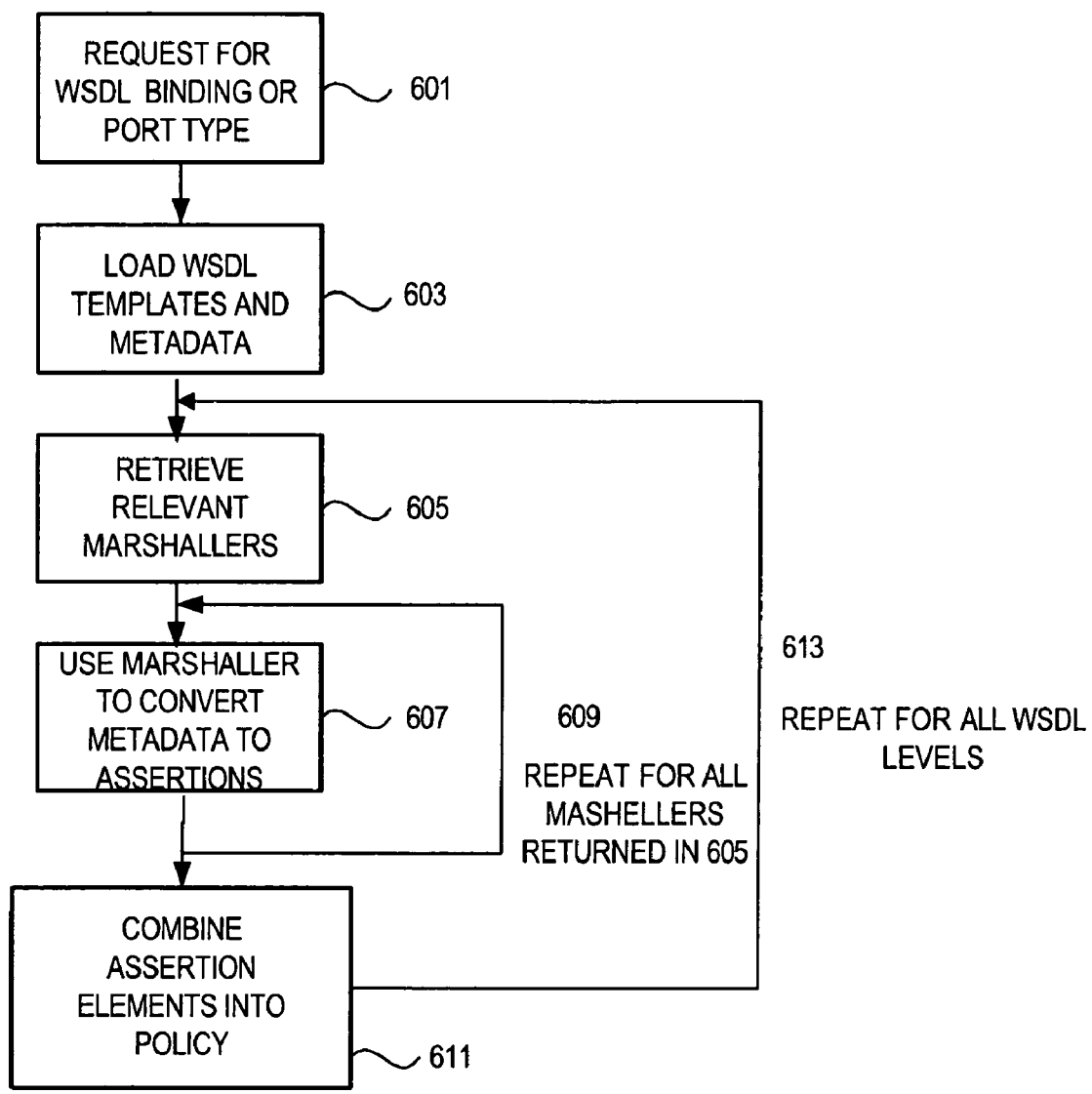
FIG. 6A illustrates an embodiment of the flow for generating WSDL policies.

FIG. 6A illustrates an embodiment of the flow for generating WSDL policies. A request for a WSDL binding or port type component is made to a visualizer at 601. The relevant WSDL template associated with the request is loaded along with metadata from at least one configuration file at 603 (for example, configurations of a configuration file is loaded with the request).

The set of relevant marshallers (converters) needed to process a configuration file is retrieved from a registry (marshaller factory) or other storage location on the Web services provider at 605. Each marshaller provides functionality to convert configuration file properties into assertion elements. There is at least one marshaller per each policy domain.

A marshaller from the set is used to convert configuration metadata into assertion elements at 607. An embodiment of this conversion is described in greater detail in FIG. 6B.

Each converter from the set performs the conversion of 607 at 609. In other words, the conversion process should be repeated for each policy domain. The results of all of the conversions, assertion elements, are combined to form a policy element at 611. This policy element is applied to the WSDL template loaded at 603 to create the WSDL component requested at 601.

This conversion from metadata to a policy element may be repeated at 613 for the other WSDL levels until a complete policy annotated WSDL is formed. For example, if the request at 601 was for a port type, the conversion may be repeated for binding. Of course, it should be understood that if the policy annotated WSDL is being updated for a particular component (binding, port type, etc.) then the other components may not need to be updated and the conversion from metadata to policy element does not need to occur.

Figure 6B:
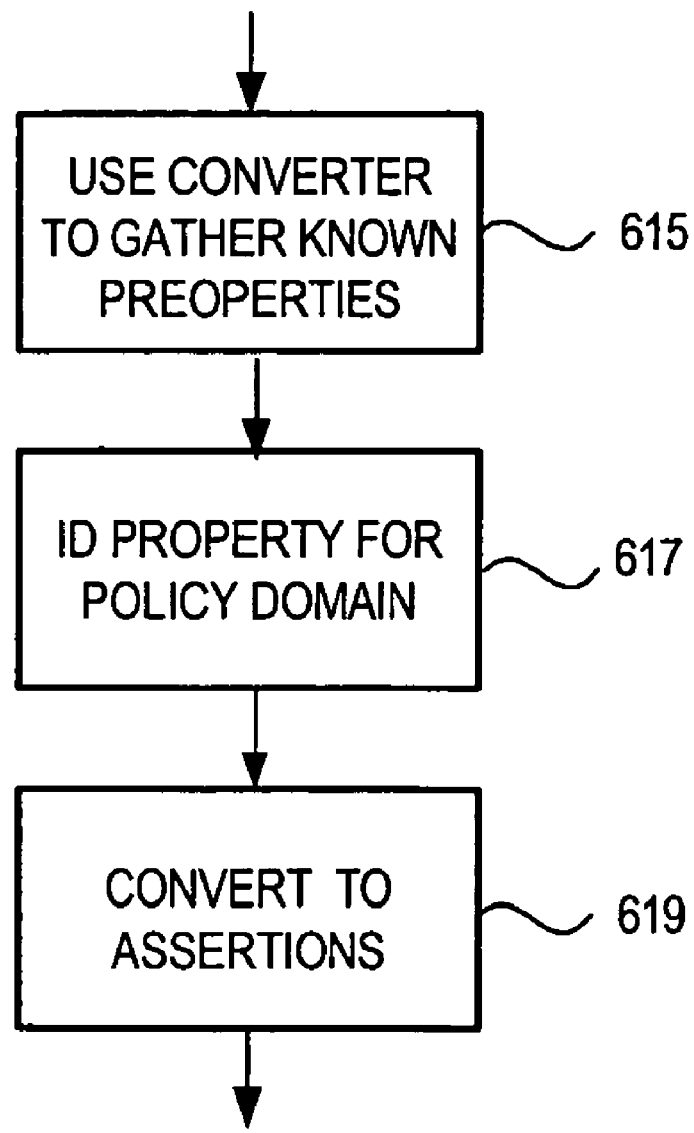
FIG. 6B illustrates an embodiment of the flow for the conversion of metadata to assertion elements.

FIG. 6B illustrates an embodiment of the flow for the conversion of metadata to assertion elements. Each marshaller is aware of a few properties that a particular policy domain supports. In other words, each marshaller may only process properties that it supports. The names of these known properties for a specific policy domain are gathered by a marshaller from the configuration file that the marshaller is associated with at 615.

These property names are compared to the configuration metadata to identify which properties are stored in the metadata and therefore convertible by the marshaller at 617. In other words, the marshaller not only has the capability to process a particular metadata but the configuration file contains the metadata. In one embodiment, this comparison is done by a so-called configuration builder. This builder is also responsible for gathering the marshallers from the registry.

The identified metadata is then converted into assertion elements by the marshaller at 619. This process of retrieving property names that the marshaller supports the conversion of, identifying the metadata that is available to be converted by this particular marshaller, and converting this metadata into assertion elements is repeatable for each marshaller from the set of marshallers of the marshaller factory.

In one embodiment, there is a single generic marshaller to perform operations on every type policy domain. Therefore, certain tasks described above may be eliminated. For example, the comparison at 617 may be eliminated.

Client Side Configuration Creation

As described earlier, clients retrieve WSDL documents from Web service providers. These WSDL documents need to be "converted" into an understandable form (WS metadata) for the client. A part of this conversion is to create metadata property names from assertions in the XML (WSDL) document.

Figure 7:
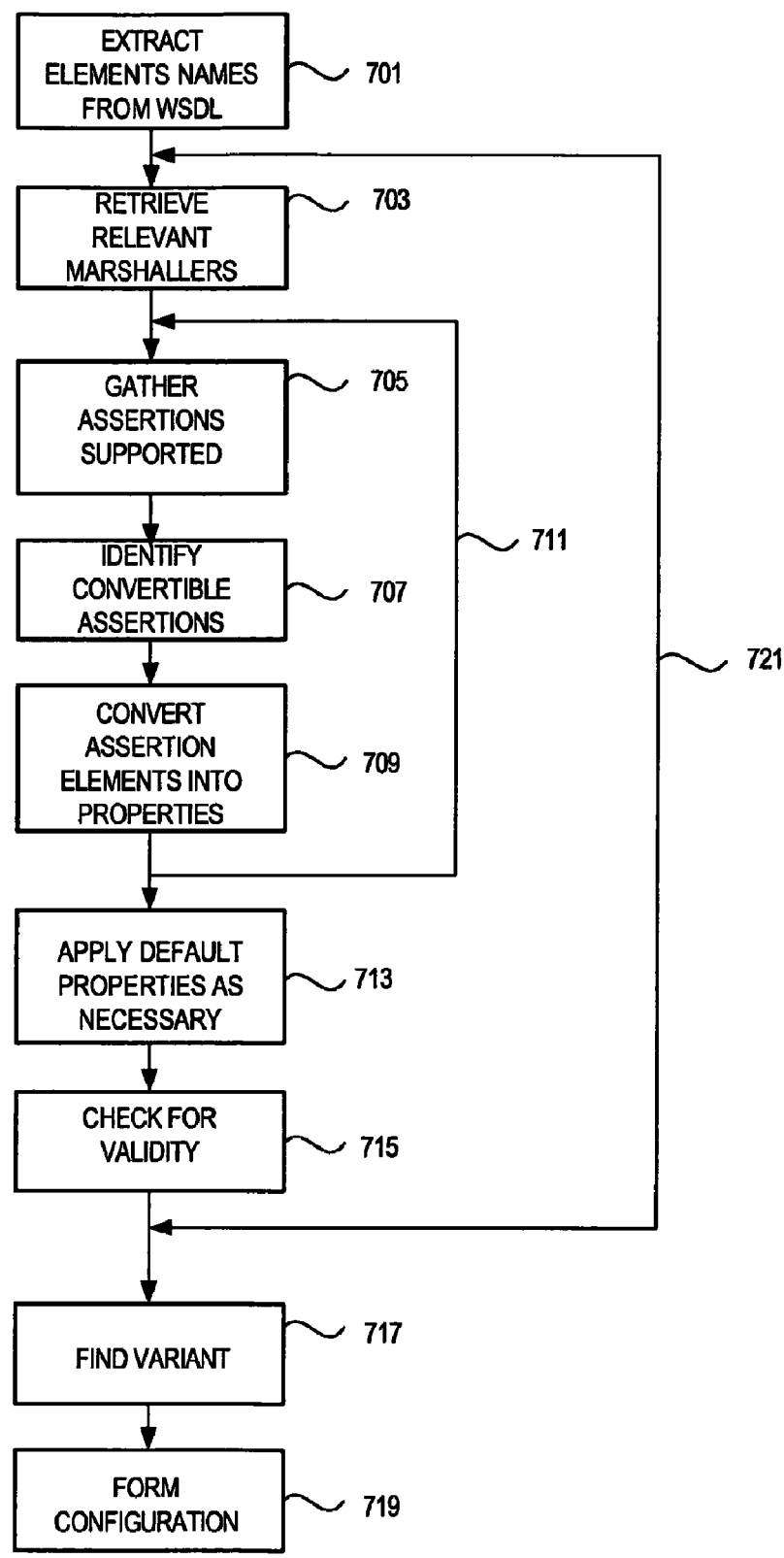
FIG. 7 illustrates an embodiment of the flow for generating a configuration file from a policy annotated WSDL.

FIG. 7 illustrates an embodiment of the flow for generating a configuration from a policy annotated WSDL. From one WSDL, a configuration file is generated, which file could contain several configurations, depending how many endpoints (ports) the WSDL has. Assertion element names for a specific WSDL level (for example, port type, binding, etc.) are gathered from the policy annotated WSDL at 701. Each marshaller provides functionality to convert WSDL assertions into metadata properties. In one embodiment, there is one marshaller per each assertion. Each marshaller is aware of a few properties that a particular assertion supports. In other words, each marshaller may only process assertions that it supports.

Using these assertion element names, the associated marshallers are retrieved from a registry or other storage location of the client, such as a marshaller factory, at 703. For a particular marshaller retrieved at 703, the marshaller gathers the set of assertions that the marshaller supports at 705. In other words, this set identifies which assertions the marshaller is able to process into metadata properties.

These assertion element names are compared to the WSDL to identify which assertions are in the WSDL and are therefore convertible by the marshaller at 707. In other words, the marshaller not only has the capability to process a particular assertion but the WSDL contains the assertion. In one embodiment, this comparison is done by a so-called configuration builder. This builder is also responsible for gathering the marshallers from the registry.

The marshaller used at 703 converts the assertion elements of the WSDL into metadata properties at 709. Each marshaller from the set performs the conversion of 709 at 711. The results of all of the conversions, metadata properties, are combined to form a property list. Because there are properties for which no match could be found at 707, default properties of the marshaller are applied to the property list at 713.

It is possible that two or more properties cannot be combined into the same metadata. In other words, the property list may have conflicting entries. For example, the property list may show that the for security purposes a signature is required but later in the list shows that a signature is not required. For this reason, the updated property list is checked for validity at 715 and any problems are reported to the client. If there are problems, the processing is stopped and requires further investigation to determine the proper course of action. For example, the property list may need to be manually adjusted. Each WSDL level should perform the above operations at 721.

The marshaller checks for abstract properties that correspond to a specific concrete property and returns a list of possible abstract configurations (variants) at 717. This relates a specific concrete portion of the WSDL to a specific abstract property. For example, specific type of encryption is a concrete portion of the WSDL and this relates to the abstract configuration of overall security.

Abstract configuration alternatives may exist as different marshallers may return valid configuration alternatives. Because of this the configuration alternatives are intersected to form a single abstract configuration that applies to the complete WSDL at 719. For example, a security marshaller may return configurations for two different types of RSA encryption (HTTP and SSL). A reliable messaging marshaller may only have one type of RSA encryption (HTTP). While each of these alternatives provided by each respective marshaller is valid, only one configuration alternative is common to all marshallers, RSA HTTP.

In one embodiment, there is a single generic marshaller to perform operations on every type of assertion. Therefore, certain tasks described above may be eliminated. For example, the creation of the assertion array at 707 may be eliminated with a single generic marshaller.

Figure 8:
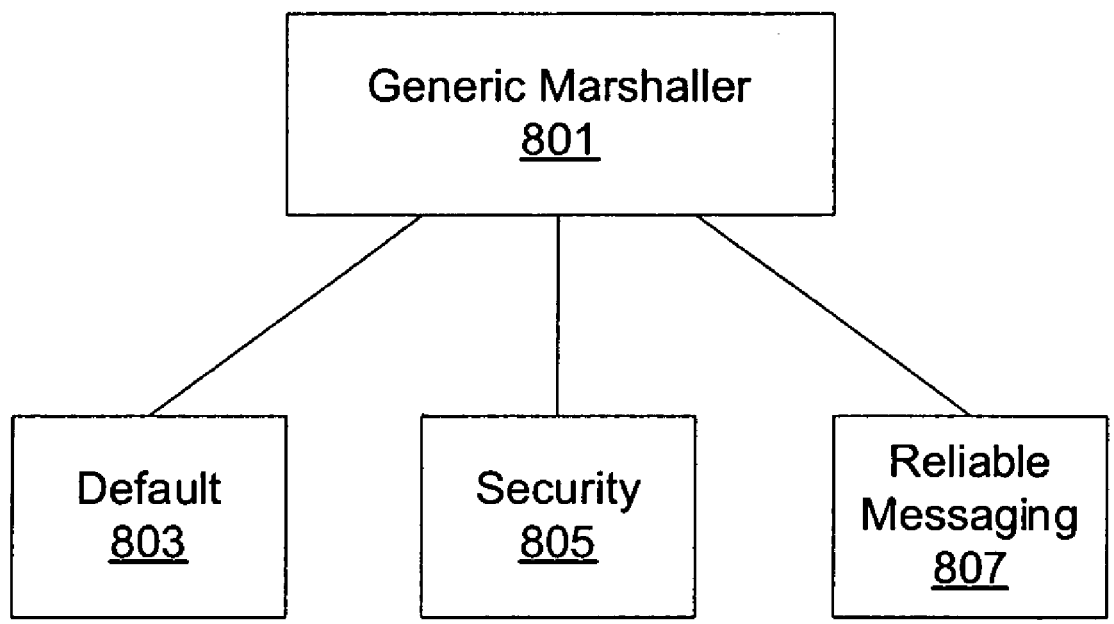
FIG. 8 illustrates the inheritance properties of marshallers according to one embodiment.

In one embodiment, marshallers on both the client and provider side have the same basic functionality that stems from a generic parent marshaller. FIG. 8 illustrates the inheritance properties of marshallers according to one embodiment. The generic marshaller 801 provides functions for: 1) getting the known assertion names from a WSDL; 2) getting known property names from a configuration file; 3) converting assertions into metadata; 4) converting metadata into assertions; 5) applying default properties to a listing of properties; 3) finding variants; and 7) checking a configuration file for errors. Additional functionality may be added to the generic marshaller as the Web services provider adds functionality.

This generic marshaller serves as the model for a default configuration marshaller 803 (this marshaller applies the default properties to a listing of properties), a security marshaller 805 (this marshaller knows the security rules such as encryption and/or signature type), and a reliable messaging marshaller 807 (this marshaller knows the rules associated with reliable messaging). Each of these marshallers may inherit all of or a subset of the functions provided by the generic marshaller 801. Additional marshallers may be added as functionality is added with the Web service.

The use of common marshallers allows for easier deployment of Web services as separate marshallers do not have to be developed for the client and provider side. As the marshallers have common functionality (commands) it is also easier to program because there are no difference between commands used by each marshaller. For example, the convert metadata into assertions command of the security marshaller 805 is the same as the reliable messaging marshaller 807.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., NET, Mono, Java, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 9:
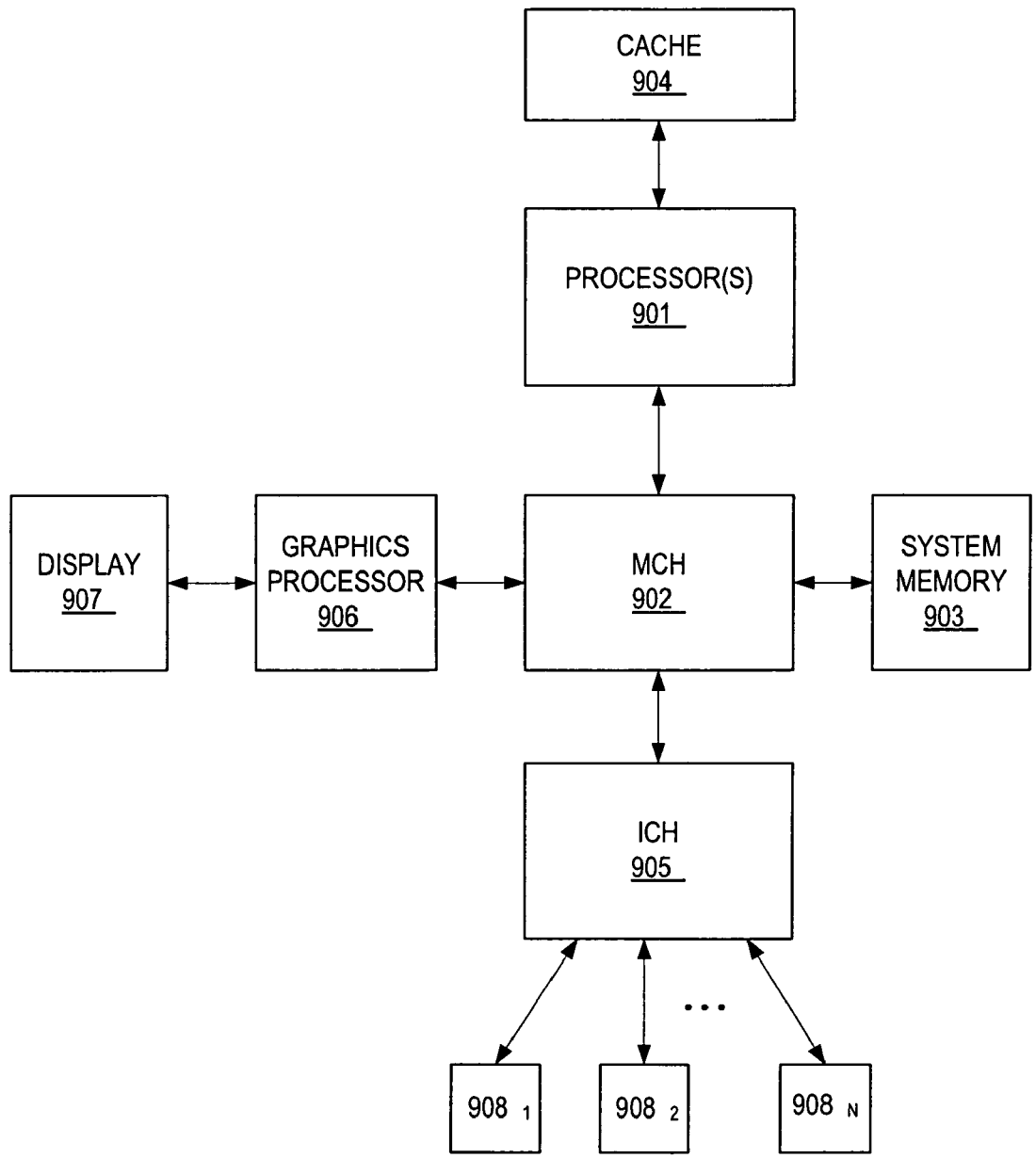
FIG. 9 is a block diagram of a computing system that can execute program code stored by an article of manufacture.

FIG. 9 shows an embodiment of a computing system (e.g., a computer). The exemplary computing system of FIG. 9 includes: 1) one or more processors 901; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), DPL, etc.; 8) one or more I/O devices 908.

The one or more processors 901 execute instructions in order to perform whatever software routines the computing system implements. The instructions frequently involve some sort of operation performed upon data. Both data and instructions are stored in system memory 903 and cache 904. Cache 904 is typically designed to have shorter latency times than system memory 903. For example, cache 904 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale non-volatile storage within the computing system (e.g., hard disk drive). ICH 905 has bi-directional point-to-point links between itself and the observed I/O devices 908.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A system, comprising:
   a configuration file to store metadata about a service provided by a Web service;
   an archive comprising a memory to store a plurality of template files, wherein the plurality of template files defines structure and syntax of portions of a WSDL (Web Services Definition Language) document and the plurality of template files comprise a service template, a binding template and a port type template; and
   a visualizer to import the service template file and metadata from the configuration file to automatically generate a service portion of the WSDL document dynamically in response to receiving a service request at a Web services provider, the service portion comprising an address where the Web service is available, the visualizer to import the binding template and metadata from the configuration file to automatically generate a binding portion of the WSDL document dynamically in response to receiving a binding request separate from the service request at the Web services provider, the binding portion comprising a data format to be used for communication with the Web service, and the visualizer to import the port type template and metadata from the configuration file to automatically generate a port type portion of the WSDL document dynamically in response to receiving a port type request separate from the service request and the binding request at the Web services provider, the port type portion comprising one or more operations to be performed by the Web service.

2. The system of claim 1, wherein the configuration file is associated with a single port of the Web service.

3. The system of claim 2, wherein the metadata of the configuration file is abstract data.

4. The system of claim 2, wherein the metadata of the configuration file is concrete data.

5. The system of claim 1, wherein the template of the archive file describes one of the following:
a type;
a message;
a port type;
a binding; or
a service.

6. The system of claim 1, wherein the archive file is an EAR (Enterprise Archive) file.

7. The system of claim 1, wherein the visualizer is a J2EE (Java 2 Platform, Enterprise Edition) engine.

8. A computer implemented method, comprising:
receiving a service request at a Web services provider;
importing a service template file from a template archive, wherein the template archive stores a plurality of template files defining structure and syntax of portions of a WSDL (Web Services Definition Language) document;
automatically generating a service portion of a Web services description document dynamically in response to the service request, the generating comprising processing the service template and metadata from a configuration file associated with at least one service provided by the Web services provider, the service portion comprising an address where the at least one service is available;
receiving a binding request separate from the service request at the Web services provider;
importing a binding template from the template archive;
automatically generating a binding portion of the Web services description document dynamically in response to the binding request, the generating comprising processing the binding template and metadata from the configuration file, the binding portion comprising a data format to be used for communication with the at least one service;
receiving a port type request separate from the service request and the binding request at the Web services provider;
importing a port type template from the template archive; and
automatically generating a port type portion of the Web services description document dynamically in response to the port type request, the generating comprising processing the port type template and metadata from the configuration file, the port type portion comprising one or more operations to be performed by the at least one service.

9. The method of claim 8, wherein the generating the binding portion comprises:
importing a binding template associated with the binding request;
loading the metadata of the binding template;
generating policies from the metadata; and
applying the policies on the binding template.

10. The method of claim 9, wherein the metadata of the binding template is concrete metadata.

11. The method of claim 8, wherein automatically generating the port type portion comprises:
importing a port type template associated with the port type request;
loading the metadata of the port type template;
generating policies from the metadata; and
applying the policies on the port type template.

12. The method of claim 11, wherein the metadata of the port type template is abstract metadata.

13. The method of claim 8, wherein the generating the service portion of the Web services description document is to be automatically performed without manual intervention.

14. The method of claim 8, wherein the binding request is to be received during a run time.

15. The method of claim 8, wherein each of the service portion, the binding portion and the port type portion is generated using a different template file from one another.

16. The method of claim 8, wherein the at least one service is associated with a plurality of ports including a first port and a second port, wherein the automatically generating the binding portion comprises:
determining a port associated with the binding request; and
providing a binding template to be used for generating the binding portion, the providing including importing a first binding template upon determination that the binding request is associated with the first port and importing a second binding template upon determination that the binding request is associated with the second port, the first binding template different from the second binding template.

17. The method of claim 8, wherein each of the service portion, the binding portion and the port type portion is generated at the Web services provider.

18. An article of manufacture comprising a memory including stored program code which, when executed by a machine, causes the machine to perform operations comprising:
receiving a service request at a Web services provider;
importing a service template file from a template archive, wherein the template archive stores a plurality of template files defining structure and syntax of portions of a WSDL (Web Services Definition Language) document;
automatically generating a service portion of a Web services description document dynamically in response to the service request, the generating comprising processing the service template and metadata from a configuration file associated with at least one service provided by the Web services provider, the service portion comprising an address where the at least one service is available;
receiving a binding request separate from the service request at the Web services provider;
importing a binding template from the template archive;
automatically generating a binding portion of the Web services description document dynamically in response to the binding request, the generating comprising processing the binding template and metadata from the configuration file, the binding portion comprising a data format to be used for communication with the at least one service;

receiving a port type request separate from the service request and the binding request at the Web services provider;

importing a port type template from the template archive; and automatically generating a port type portion of the Web services description document dynamically in response to the port type request, the generating comprising processing the port type template and metadata from the configuration file, the port type portion comprising one or more operations to be performed by the at least one service.

19. The article of manufacture of claim 18, wherein the generating the binding portion comprises:

importing a binding template associated with the binding request;

loading the metadata of the binding template;

generating policies from the metadata; and applying the policies on the binding template.

20. The article of manufacture of claim 19, wherein the metadata of the binding template is concrete metadata.

21. The article of manufacture of claim 18, wherein automatically generating the port type portion comprises:

importing a port type template associated with the port type request;

loading the metadata of the port type template;

generating policies from the metadata; and applying the policies on the port type template.

22. The article of manufacture of claim 21, wherein the metadata of the port type template is abstract metadata.

* * * * *